United States Patent
Shaked et al.

(10) Patent No.: US 12,287,774 B1
(45) Date of Patent: Apr. 29, 2025

(54) TECHNIQUES FOR AUTOMATICALLY IDENTIFYING UNDECLARED COMPOSITE KEY RELATIONSHIPS IN A DATABASE SCHEMA

(71) Applicant: Oracle International Corporation, Redwood Shores, CA (US)

(72) Inventors: Guy Shaked, Be'er Sheva (IL); Ilya Tebelev, Be'er Sheva (IL)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/581,656

(22) Filed: Feb. 20, 2024

(51) Int. Cl.
*G06F 16/00* (2019.01)
*G06F 16/21* (2019.01)
*G06F 16/22* (2019.01)
*G06F 16/23* (2019.01)

(52) U.S. Cl.
CPC ........ *G06F 16/2365* (2019.01); *G06F 16/212* (2019.01); *G06F 16/2264* (2019.01)

(58) Field of Classification Search
None
See application file for complete search history.

(56) References Cited

U.S. PATENT DOCUMENTS

| | | | |
|---|---|---|---|
| 6,965,891 B1 * | 11/2005 | Jakobsson | G06F 16/2255 707/999.005 |
| 7,426,520 B2 | 9/2008 | Gorelik | |
| 7,778,782 B1 * | 8/2010 | Pearson | G16B 25/10 702/27 |
| 9,336,192 B1 | 5/2016 | Barba | |
| 10,740,333 B1 * | 8/2020 | Betawadkar-Norwood | G06F 16/2458 |
| 11,243,956 B1 * | 2/2022 | Papakonstantinou | G06F 16/24565 |
| 2004/0215626 A1 * | 10/2004 | Colossi | G06F 16/22 |
| 2004/0259764 A1 * | 12/2004 | Tugendreich | C12Q 1/6883 702/19 |
| 2005/0038784 A1 * | 2/2005 | Zait | G06F 16/22 707/999.005 |
| 2007/0083572 A1 * | 4/2007 | Bland | G06F 16/254 |
| 2008/0243832 A1 | 10/2008 | Adams | |

(Continued)

OTHER PUBLICATIONS

Shaked, U.S. Appl. No. 17/899,799, filed Aug. 31, 2022, Non-Final Rejection, Feb. 29, 2024.

*Primary Examiner* — Hasanul Mobin
(74) *Attorney, Agent, or Firm* — Hickman Becker Bingham Ledesma LLP

(57) ABSTRACT

Techniques are described herein for automatically discovering undeclared PK-FK relationships between dimension tables and a fact table in situations where: the primary keys of the dimension tables (a) are not known, and (b) are composite keys, and the foreign keys of the fact table (a) are not known, and (b) are composite keys. The techniques involve removing from consideration all fact table columns that satisfy first removal criteria, and all dimension table columns that satisfy second removal criteria. Fingerprints are generated for the fact and dimension table columns that remain. Matched pairs (e.g. two fact table columns and two dimension table columns) are generated based on the columns that have not been filtered. The matched pairs are further filtered based on third removal criteria. The matched pairs that remain are then graded, and a PK-FK relationship is established based on the matched pair with the highest grade.

20 Claims, 3 Drawing Sheets

(56) References Cited

U.S. PATENT DOCUMENTS

| | | | |
|---|---|---|---|
| 2009/0177621 A1* | 7/2009 | Le | G06F 16/2453 |
| 2011/0296187 A1* | 12/2011 | Bisso | G06F 21/577 |
| | | | 707/769 |
| 2012/0011096 A1* | 1/2012 | Aggarwal | G06F 16/2379 |
| | | | 707/602 |
| 2012/0101975 A1 | 4/2012 | Khosravy | |
| 2012/0323929 A1* | 12/2012 | Kimura | G06F 16/2282 |
| | | | 707/E17.084 |
| 2015/0199352 A1* | 7/2015 | Bush | G06F 16/24558 |
| | | | 707/747 |
| 2021/0117437 A1* | 4/2021 | Gibson | G06F 16/258 |
| 2021/0182280 A1* | 6/2021 | Picard | G06F 16/2282 |
| 2021/0365443 A1 | 11/2021 | Mostafa | |
| 2021/0406452 A1 | 12/2021 | Hasan | |
| 2022/0198581 A1 | 6/2022 | Rusu | |
| 2023/0112250 A1* | 4/2023 | Agrawal | G06F 16/221 |
| | | | 707/714 |

* cited by examiner

TECHNIQUES FOR AUTOMATICALLY IDENTIFYING UNDECLARED COMPOSITE KEY RELATIONSHIPS IN A DATABASE SCHEMA

FIELD OF THE INVENTION

The present invention relates to database systems and, more specifically, to automatically detecting undeclared primary key/foreign key relationships involving composite keys.

BACKGROUND

The "primary key" (PK) of a table is a key for which each row of the table has a unique value. For example, in an "emp" table where each row corresponds to a distinct employee, the PK may be the employee identifier of the employee. Such a table may have an "emp_id" column which, for each row, stores the employee identifier of the employee that corresponds to the row. The emp table may have additional columns, such as firstname, lastname, and age, which may store values that are not unique. For example, multiple rows of the emp table may store the value "Joe" in the firstname column.

Fact tables are tables that store measurements, metrics or facts (which often relate to a business process). A fact table often has a set of related dimension tables. Fact tables and dimension tables are described in detail at en.wikipedia.org/wiki/Fact_table, the entire contents of which is incorporated herein by reference. Fact tables store "foreign keys" (FKs). FKs are keys whose values are limited to the values stored in the PK column of another table. For example, a "sales" table may have a "salesperson" column. Since the salesperson for any given sale is an employee of the company, the values stored in the salesperson column of the sales table may be limited to the values that are stored in the emp_id column of the emp table. Thus, emp.emp_id and sales.salesperson are columns that have a PK-FK relationship.

For a variety of reasons, it is important for a database system to know the PK-FK relationships that exist between columns. For example, if a database system knows that emp_id is the PK of the emp table, the database system can prevent attempts to add additional rows to the emp table that have the same emp_id value as an already-exiting row. Similarly, by knowing that salesperson has an FK relationship to the emp_id key, the database can prevent the insertion into the "sales" table of any row that has a salesperson value that does not match any value in the emp_id column of the emp table. In addition, tables involved in a PK-FK relationship are likely to be joined based on the PK-FK columns. Consequently, by knowing the columns that are likely to be joined, the database system may create indexes and execution plans to improve performance of such joins.

Most database systems have a mechanism to allow users to formally declare such PK-FK relationships. That is, a database command may be submitted to the database system to expressly indicate that emp.emp_id-sales.salesperson is a PK-FK relationship. In response to such commands, the database system stores, within the database, metadata indicating the PK-FK relationship. Based on the PK-FK relationship metadata, the database system can both optimize for likely joins and enforce the constraints implicit in the known PK-FK relationships.

However, there are situations where PK-FK relationships go undeclared. A PK-FK relationship may go undeclared, for example, if the database administrator that is setting up the database simply forgets to declare the relationship. In other situations, a database administrator may initially declare a PK-FK relationship, but later delete/disable it to improve performance of the database system. Removing a PK-FK relationship may improve performance during bulk loads, for example, by (a) avoiding the need for the database system to check for the uniqueness of the emp_id value of every inserted emp table row, (b) avoiding the need to check that the salesperson value of each inserted sales table row corresponds to an existing emp_id value, and (c) avoiding the need to complete the bulk load on the emp table before starting the bulk load on the order table.

PK-FK relationships that have not been formally declared by a user (or which have been deleted after initially being declared) are referred to herein as "undeclared PK-FK relationships". Though not formally declared by a user, it is still important for the database system to know of the existence of such PK-FK relationships. Consequently, techniques have been developed to allow a database system to automatically determine undeclared PK-FK relationships where the PKs correspond to a single column of a dimension table, and the FKs correspond to a single column of a fact table.

Unfortunately, those automatic-relationship-finding techniques do not work well in situations where the keys in question are composite keys. A composite key is a key that is created by combining the values from two or more columns of a table. For example, assume that the emp table has no emp_id column. In this case, a PK for the emp table may be formed by combining the columns: "firstname" and "lastname". Within the emp table, each of those columns may store duplicate values, but the combination of the values from both of those columns would be unique for each employee in the emp table (assuming no employees had exactly the same name). Because two columns in the emp table are needed to store the values for the firstname.lastname composite PK, two columns would typically be used in the sales table to store the corresponding FK values.

Existing automatic-relationship-finding techniques cannot efficiently find the PK-FK relationships under such circumstances, largely due to the need to test each combination of columns in the dimension table with each combination of columns in the fact table. The work required to find such PK-FK relationships increases exponentially with the number of columns in the dimension and fact tables. Thus, what is needed is a technique to efficiently and automatically determine undeclared PK-FK relationships in situations involving composite keys.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
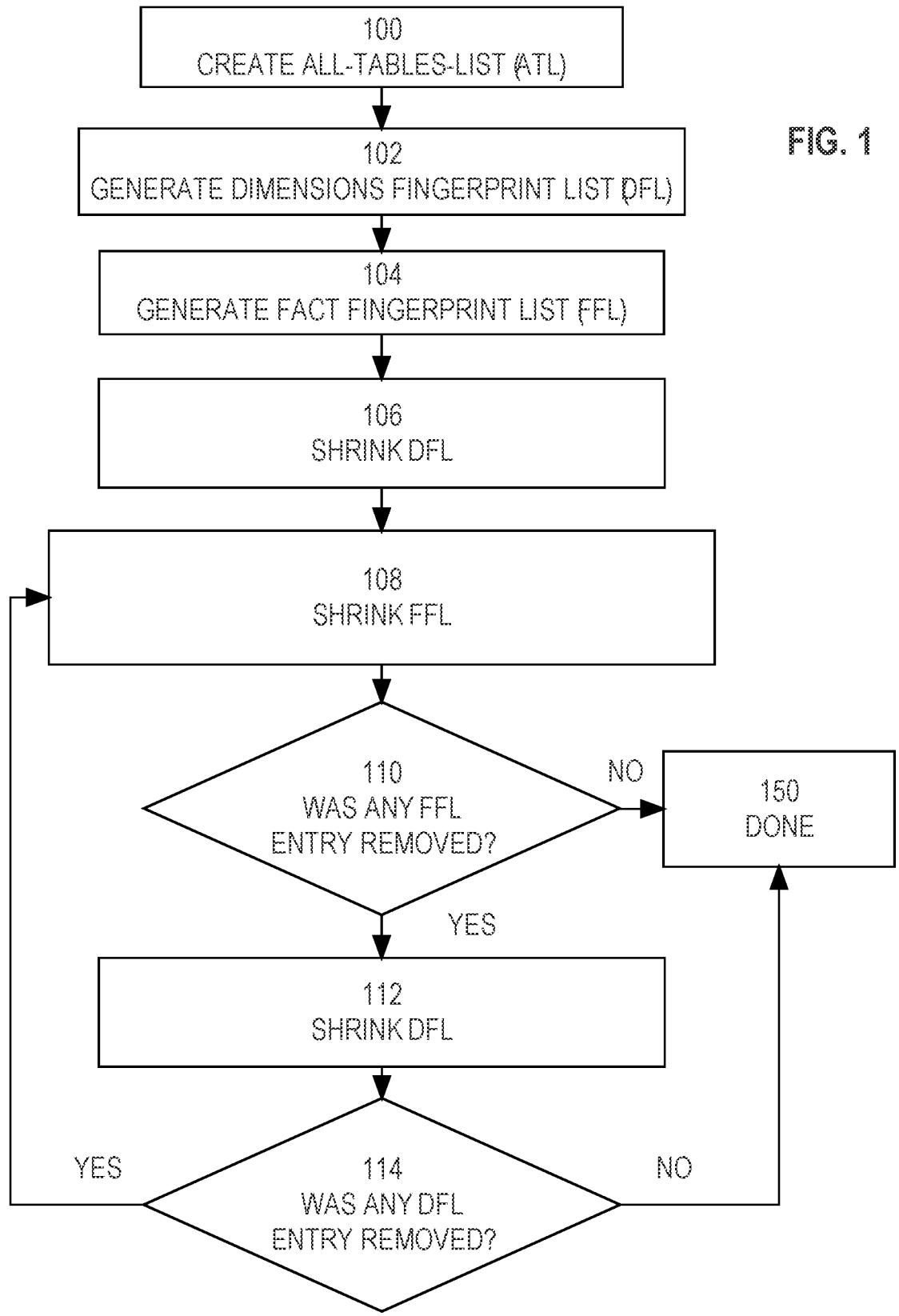
FIG. 1 is a flowchart illustrating steps for reducing the number of candidate columns to consider when attempting to discover undeclared PK-FK relationships that are based on composite keys, according to one implementation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for automatically discovering undeclared PK-FK relationships between dimension tables and a fact table in situations where:
- the primary keys of the dimension tables (a) are not known, and (b) are composite keys; and
- the foreign keys of the fact table (a) are not known, and (b) are composite keys.

In such situations, the number of possible column combinations to check is often very large, so the techniques employ a smart heuristic and several assumptions to minimize the number of combination checks. The term "relationship discovery module", as used herein, generally refers to logic that causes a computer system to perform the techniques, described hereafter, for automatically discovering undeclared PK-FK relationships that involve composite keys.

While composite keys can include more than two columns, for the purpose of simplifying the explanation, the examples given herein are limited to situations where the composite keys are made from exactly two columns. In one implementation, the techniques operate under the following assumptions:
- There is no single-column PK in the dimension table. That is, the dimension table has no single column whose values are guaranteed to be unique.
- The dimension table has three or more columns.
- Within the two columns that correspond to an undeclared PK, each composite PK value will be unique. Thus, if the undeclared PK of the emp table is firstname.lastname, then no two rows of the emp table will have the same combination of firstname and lastname values as any other row in the emp table.
- All value combinations in the undeclared FK columns in the fact table will exist in the undeclared PK columns of the dimension table.
- Composite key columns have the same data type in the fact table as their counterparts in the dimension table.

Example Database Schema

The database schema used in the examples given hereafter has three tables: SALES, TIMES, CUSTOMERS. The TIMES table has a declared single-column PK (time_id). The CUSTOMERS table has no declared PK. The SALES table has no declared FK relationship to the CUSTOMERS table. The CUSTOMER table has the following columns:
CUST_FIRST_NAME.
CUST_LAST_NAME.
CUST_GENDER
CUST_YEAR_OF_BIRTH.
CUST_MARITAL_STATUS.
CUST_STREET_ADDRESS
CUST_POSTAL_CODE.
CUST_CITY
CUST_CITY_ID.
CUST_STATE_PROVINCE
CUST_STATE_PROVINCE_ID.
COUNTRY_ID.
CUST_MAIN_PHONE_NUMBER.
CUST_INCOME_LEVEL.
CUST_CREDIT_LIMIT
CUST_EMAIL
CUST_TOTAL
CUST_TOTAL_ID.
CUST_SRC_ID
CUST_EFF_FROM
CUST_EFF_TO.
CUST_VALID The SALES table has the following columns:
PROD_ID.
TIME_ID.
CHANNEL_ID.
PROMO_ID
QUANTITY_SOLD.
AMOUNT_SOLD.
CUST_FIRST_NAME.
CUST_LAST_NAME

Shrinking the Set of Candidate Columns

As explained above, if the set of columns that could be involved in an undeclared composite-key-based PK-FK relationship is large, it is not practical to attempt to automatically discover the composite-key-based PK-FK relationship using conventional techniques.

Therefore, to perform auto composite-key-based PK-FK relationship discovery more efficiently, the techniques described herein are used to determine the smallest set of columns that could possibly be involved in a composite-key-based PK-FK relationship. Once the smallest set of candidate columns is determined, combinations of the columns may be tested to determine whether a PK-FK relationship actually exists.

FIG. 1 is a flowchart that illustrates a process performed by the relationship discovery module to automatically shrink the set of candidate columns that may be involved in an undeclared composite-key-based PK-FK relationship, according to an implementation. Referring to FIG. 1, at step 100, the relationship discovery module generates an "All Table List" (ATL). The ATL is a list of all columns of all dimension tables that could be involved in an undeclared composite-key-based PK-FK relationship with a fact table. In one implementation, the ATL excludes:
- all columns from dimension tables that have a single declared PK column
- all columns from dimension tables that have fewer than three columns
- all columns that are storing a single distinct value or no value
- all columns that have already been identified as an FK
- all columns that store measures (a measure is a property on which calculations can be made (See en.wikipedia.org/wiki/Measure_(data_warehouse)))

In the present example, TIMES and CUSTOMERS are dimension tables. TIMES has a single-column primary key, so all columns of TIMES are excluded. Therefore, the ATL initially would include only the columns of the CUSTOMERS table. Of the columns in the CUSTOMERS table, the following columns may also be excluded from the ALT:
CUST_TOTAL
CUST_TOTAL_ID
CUST_SRC_ID
CUST_EFF_FROM
CUST_EFF_TO These columns may be excluded from the ATL either because (a) they only have one or zero distinct values, (b) they have already been identified as an FK, or (c) they represent a measure column.

At step 102, the relationship discovery module generates a Dimensions Fingerprint List (DFL). In one implementation, the DFL is table where each entry corresponds to a column in the ATL, and indicates a "fingerprint" for the column. The fingerprint for a column may be generated using any one of a variety of methods. For the purpose of explanation, it shall be assumed that the fingerprints contained in the DFL are generated by the relationship discovery module based on the character distribution of the values contained in the column. Examples of such techniques are described in U.S. patent application Ser. No. 17/899,799, entitled "METHOD FOR IDENTIFYING A SEMATIC TYPE OF DATA CONTAINED IN A COLUMN OF A TABLE", filed on Aug. 31, 2022, the entire contents of which is incorporated herein by this reference. For the purpose of explanation, it shall be assumed that the GCD technique (which is a sorted list of the distinct characters that occur in any value in the column) described therein is used for generating the fingerprints of the DFL. Using such fingerprint generation techniques, the fingerprint of all columns in any given dimension table may be generated using a single scan to the table.

Within the DFL, the entry for a column may include the actual GCD-generated fingerprint, as well as the table name, and column name of the corresponding column. For the purpose of explanation, it shall be assumed that the DFL generated at step 102 (for the non-excluded columns of the CUSTOMERS table) has the following entries:

Similar to the DFL, the fingerprints of the FFL may be generated during a single scan of the fact table. Prior to generating the FFL, columns of the fact table may be excluded if (a) they only have one or zero distinct values, (b) they have already been identified as an FK, or (c) they represent a measure column.

In the present example, the SALES table is the fact table. It shall be assumed that the following columns of the SALES table have been excluded from consideration:
TIME_ID (a known FK)
QUANTITY_SOLD (a measure column)
AMOUNT_SOLD (a measure column)

Thus, using the GCD technique for generating fingerprints, the FFL may have the following entries:

| Sales column | GCD |
|---|---|
| PROD_ID | 0123456789 |
| CHANNEL_ID | 2349 |
| PROMO_ID | 01359 |
| CUST_FIRST_NAME | ABCDEFGHIJKLMNOPRSTUVWXYZabcdefghijklmnopqrstuvwxyz |
| CUST_LAST_NAME | ABCDEFGHIJKLMNOPQRSTUVWXYZabcdefghijklmnoprstuvwxyz |

After the initial DFL and FFL have been created, steps are performed for iteratively shrinking the two lists. At step 106, the relationship discovery module performs operations to shrink the DFL, and at step 108, the relationship discovery module performs operations to shrink the FFL. If either list shrinks, then another attempt is made to shrink the other list. Control ultimately passes to step 150 when no further shrinkage is possible.

Specifically, at step 106 the relationship discovery module may remove one or more entries from the DFL if (a) such an entry correspond to columns that have no counterpart column in the FFL, (b) the fingerprint in the entry is not a superset (identical fingerprints count as a superset) of any fingerprint in the FFL, or (c) the entry is for a dimension table that has no other column in the DFL. A column in the DFL does not have a counterpart if, for example, the column has a datatype that is different from any column in the FFL.

| Customers column | GCD |
|---|---|
| CUST_FIRST_NAME | ABCDEFGHIJKLMNOPQRSTUVWXYZabcdefghijklmnopqrstuvwxyz |
| CUST_LAST_NAME | ABCDEFGHIJKLMNOPQRSTUVWXYZabcdefghijklmnoprstuvwxyz |
| CUST_GENDER | FM |
| CUST_YEAR_OF_BIRTH | 0123456789 |
| CUST_MARITAL_STATUS | .DMNSWabcdegilmnoprstvw |
| CUST_STREET_ADDRESS | .0123456789ABCDEFGHIJKLMNOPQRSTUVWZabcdefghijklmnopqrstuvwxyz |
| CUST_POSTAL_CODE | 0123456789 |
| CUST_CITY | ',-.ABCDEFGHIJKLMNOPQRSTUVWYZabcdefghijklmnopqrstuvwxyz |
| CUST_CITY_ID | 0123456789 |
| CUST_STATE_PROVINCE | '-ABCDEFGHIJKLMNOPQRSTUVWXYZabcdefghijklmnopqrstuvwxyz |
| CUST_STATE_PROVINCE_ID | 0123456789 |
| COUNTRY_ID | 0123456789 |
| CUST_MAIN_PHONE_NUMBER | ( )-0123456789 |
| CUST_INCOME_LEVEL | ,-0123456789:ABCDEFGHIJKLabdelnovw |
| CUST_CREDIT_LIMIT | 013579 |
| CUST_EMAIL | .2@ABCDEFGHIJKLMNOPRSTUVWXYZabcdefghijklmnopqrstuvwxyz |
| CUST_VALID | Al |

At step 104, the relationship discovery module generates a Fact Fingerprint List (FFL). An FFL is similar to the DFL except that the FFL is based on the columns of the fact table.

In the present example, the following entries of the DFL would be removed for not having a counterpart column in the FFL table:

| Customers column | GCD |
|---|---|
| CUST_YEAR_OF_BIRTH | 0123456789 |
| CUST_STREET_ADDRESS | .0123456789ABCDEFGHIJKLMNOPQRSTUVWYZabcdefghijklmnopqrstUvwxyz |
| CUST_POSTAL_CODE | 0123456789 |
| CUST_CITY | ',-.ABCDEFGHIJKLMNOPQRSTUVWYZabcdefghijklmnopqrstuvwxyz |
| CUST_CITY_ID | 0123456789 |
| CUST_STATE_PROVINCE | '-ABCDEFGHIJKLMNOPQRSTUVWXYZabcdefghijklmnopqrstuvwxyz |
| CUST_STATE_PROVINCE_ID | 0123456789 |
| COUNTRY_ID | 0123456789 |
| CUST_MAIN_PHONE_NUMBER | ( )-0123456789 |
| CUST_INCOME_LEVEL | ,-0123456789:ABCDEFGHIJKLabdelnovw |
| CUST_CREDIT_LIMIT | 013579 |
| CUST_EMAIL | .2@ABCDEFGHIJKLMNOPRSTUVWXYZabcdefghijklmnopqrstuvwxyz |

The following entries of the DFL would be removed from the DFL for not having a fingerprint that is a superset of any fingerprint in the FFL:

| Customers column | GCD |
|---|---|
| CUST_GENDER | FM |
| CUST_MARITAL_STATUS | .DMNSWabcdegilmnoprstvw |
| CUST_VALID | AI |

Thus, at the end of step 106, the DFL would have the following entries:

| Customers column | GCD |
|---|---|
| CUST_FIRST_NAME | ABCDEFGHIJKLMNOPQRSTUVWXYZabcdefghijklmnopqrstuvwxyz |
| CUST_LAST_NAME | ABCDEFGHIJKLMNOPQRSTUVWXYZabcdefghijklmnoprstuvwxyz |

At step 108, the relationship discovery module removes entries from the FFL if (a) the entries correspond to columns that have no counterpart column in the DFL, (b) the fingerprint in the entries is not a subset (identical fingerprints count as a subset) of any fingerprint in the DFL, or (c) the entry is the only remaining entry in the FFL. In the present example, the following entries of the FFL would be removed for not having a counterpart column in the FFL table:

| Sales column | GCD |
|---|---|
| PROD_ID | 0123456789 |
| CHANNEL_ID | 2349 |
| PROMO_ID | 01359 |

Thus, at the end of step 106, the FFL would have the following entries:

| Sales column | GCD |
|---|---|
| CUST_FIRST_NAME | ABCDEFGHIJKLMNOPRSTUVWXYZabcdefghijklmnopqrstuvwxyz |
| CUST_LAST_NAME | ABCDEFGHIJKLMNOPQRSTUVWXYZabcdefghijklmnoprstuvwxyz |

Steps 108 to 114 create a loop that is repeated until no further shrinkage is possible. Specifically, at step 110 it is determined whether step 108 removed any entries from the FFL. If so, control passes to step 112 and another attempt is made to shrink the DFL. Otherwise, control passes to step 150 and the list shrinking process is ended. Similarly, at step 114, it is determined whether any entry was removed from the DFL during step 112. If so, then control passes back to step 108 and another attempt is made to shrink the FFL. Otherwise, control passes to step 150 and the list shrinking process is ended.

When step 150 is ultimately reached, the lists will have been reduced to:
DFL=[CUSTOMERS.CUST_FIRST_NAME, CUSTOMERS.CUST_LAST_NAME]
FFL=[SALES.CUST_FIRST_NAME, SALES.CUST_LAST_NAME]

Generating a Filtered Collection of Matched Pairs

As used herein, a "matched pair" is a pair of column pairs. Specifically, a matched pair includes:

a pair of fact table columns from the FFL, and a pair of corresponding dimension table columns, from the DFL, that may have an undeclared PK-FK relationship with the pair of fact table columns in the matched pair Each matched pair represents a potential PK-FK relationship. The fact table columns of a matched pair are referred to herein as the fact table pair ("FTP") of the matched pair, while the dimension table columns of a matched pair are referred to herein as the dimension table pair ("FTP") of the matched pair.

Figure 2:
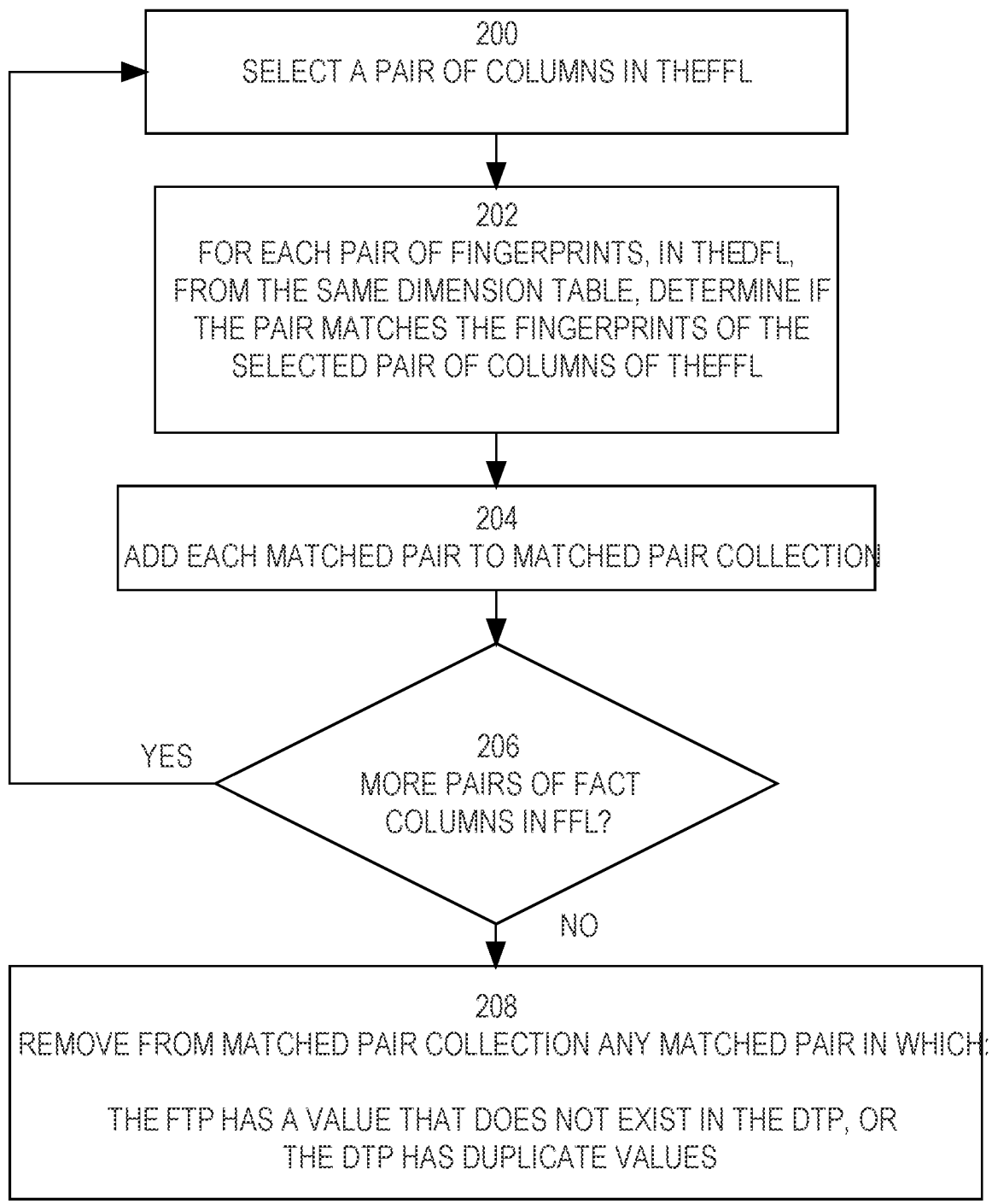
FIG. 2 is a flowchart illustrating steps for generating a filtered match pair collection, where each matched pair represents a potential undeclared PK-FK relationship that is based on composite keys, according to an implementation.

Once both the FFL and DFL have been shrunk using the technique described above, it is necessary to determine match pairs based on the columns that remain in the FFL and DFL. FIG. 2 is a flowchart for generating a collection of matched pairs by determining, for each pair of columns in the FFL, pairs of columns in the DFL that may be in an undeclared PK-FK relationship with the pair of columns in the FFL.

Referring to FIG. 2, at step 200 a pair of columns in the FFL is selected as a potential FTP. At step 202, for each pair of columns in the DFL that share a dimension table, it is determined whether the fingerprints of the DFL column pair match the fingerprints of the selected pair of columns of the FFL. For example, assume that the DFL has entries for columns c1, c2, and c3 from dimension table T1, and entries for columns 4, 5, and 6 from dimension table T2. Under these circumstances, step 202 would involve attempting to match the fingerprints from the fact table column pair selected in step 200 with the fingerprints of following combinations of dimension table columns: (c1, c2), (c1, c3), (c2, c3), (c4, c5), (c4, c6), (c5, c6).

In this context, a match does not mean that the fingerprints must be identical. Rather, it is still a match if the dimension table column fingerprints are supersets of the fact table column fingerprints. Thus, the following would constitute a match:

fact_col_1_fingerprint: 123, dimension_col_1_fingerprint 12345 fact_col_2_fingerprint: abc, dimension_col_2_fingerprint abcd

However, the following would not constitute a match:

fact_col_1_fingerprint: 12345, dimension_col_1_fingerprint 123 fact_col_2_fingerprint: abcd, dimension_col_2_fingerprint abc

At step 204, each matched pair identified in step 202 is added to a matched pair collection. The number of matched pairs produced in step 202 for any given pair of fact table columns may be as low as zero, or as high as the number of combinations of dimension table columns in the DFL.

After adding to the matched pair collection the matched pairs for the selected pair of fact table columns, control returns to step 200 to select another pair of fact table columns. This process continues until at step 206 it is determined that all fact table column pairs that can be created based on the fact table columns in the FFL have been processed. When all fact table column pairs have been processed, control proceeds to step 208.

At step 208, the matched pair collection is filtered. Specifically, in one implementation, for each matched pair in the matched pair collection, a check is performed to determine if all value combinations in the FTP of the matched pair exist in the corresponding DTP of the matched pair. If an FTP has a value combination that does not exist in the corresponding DTP, then the matched pair is removed from the matched pair collection. In addition, it is determined whether the DTP has any duplicate values. If the DTP has any duplicate values, then the DTP cannot be a primary key, and the matched pair is removed from the matched pair collection.

For example, assume that the matched pair collection includes the matched pair ((fact_col_1, fact_col_2), (dimension_col_1, dimension_col_2)), where the matched pair is established based on the following fingerprint matches:

fact_col_1_fingerprint: 123, dimension_col_1_fingerprint 12345 fact_col_2_fingerprint: abc, dimension_col_2_fingerprint abcd

Though the fingerprints match, it is possible that a row in the fact table has the values fact_col_1=3, fact_col_2=c, and that the dimension table does not have any row where dimension_col_1=3, dimension_col_2=c. Under these circumstances, the matched pair ((fact_col_1, fact_col_2), (dimension_col_1, dimension_col_2)) would be removed from the match pair collection in step 208.

For the matched pair ((SALES.CUST_FIRST_NAME, SALES.CUST_LAST_NAME), (CUSTOMERS. CUST_FIRST_NAME, CUSTOMERS. CUST_LAST_NAME)), a query that may be used to determine if all value combinations in the FTP of the matched pair exist in the corresponding DTP of the matched pair is:

select count (*) from SALES f left join CUSTOMERS d on
f.CUST_FIRST_NAME=d.CUST_FIRST_NAME and f.CUST_LAST_NAME=d.CUST_LAST_NAME where d.CUST_FIRST_NAME is null;

An example of a query that may be used to verify that the combination CUST_FIRST_NAME, CUST_LAST_NAME is unique in CUSTOMERS is:

SELECT CUST_LAST_NAME, CUST_FIRST_NAME, COUNT (*) FROM CUSTOMERS GROUP BY CUST_LAST_NAME, CUST_FIRST_NAME HAVING count (*)>1;

If the composite key (CUSTOMERS.CUST_FIRST_NAME, CUSTOMERS.CUST_LAST_NAME) is in fact a primary key of the CUSTOMERS dimension table, then execution of this query will produce an empty result set.

In one implementation, before performing step 208 for a matched pair in the matched pair collection, it is determined whether the number of distinct values in FTP of the entry is equal to or less than the number of distinct values in the DTP of the matched pair. If not, then the matched pair can be removed from the matched pair collection without incurring the overhead associated with step 208.

Determining Undeclared Pk-Fk Relationships from the Filtered Matched Pair Collection Step 208 produces a filtered matched pair collection, where each matched pair corresponds to a potential PK-FK relationship that is based on a two-column composite key. Once the filtered match pair collection is created, an analysis is performed to determine which matched pairs in the filtered pair match collection constitute actual undeclared PK-FK relationships. In one implementation, the analysis involves calculating a grade of each match pair in the filtered matched pair collection based on the match in the fingerprint and the match in the column names. Such grades may be generated, for example, using any one of various known techniques, such as those described in:

www.mdpi.com/2078-2489/11/9/421 link.springer.com/chapter/10.1007/978-3-030-82147-0_1.

medium.com/msackiit/what-is-text-similarity-and-how-to-implement-it-c74c8b641883

The entire content of each of these documents is incorporated herein by this reference. After each matched pair's combinations have been graded, the system automatically determines that the matched pairs with the best grades are undeclared composite-key-based PK-FK relationships, where the column key combination is likely to be used for joins between the relevant fact and dimension tables.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
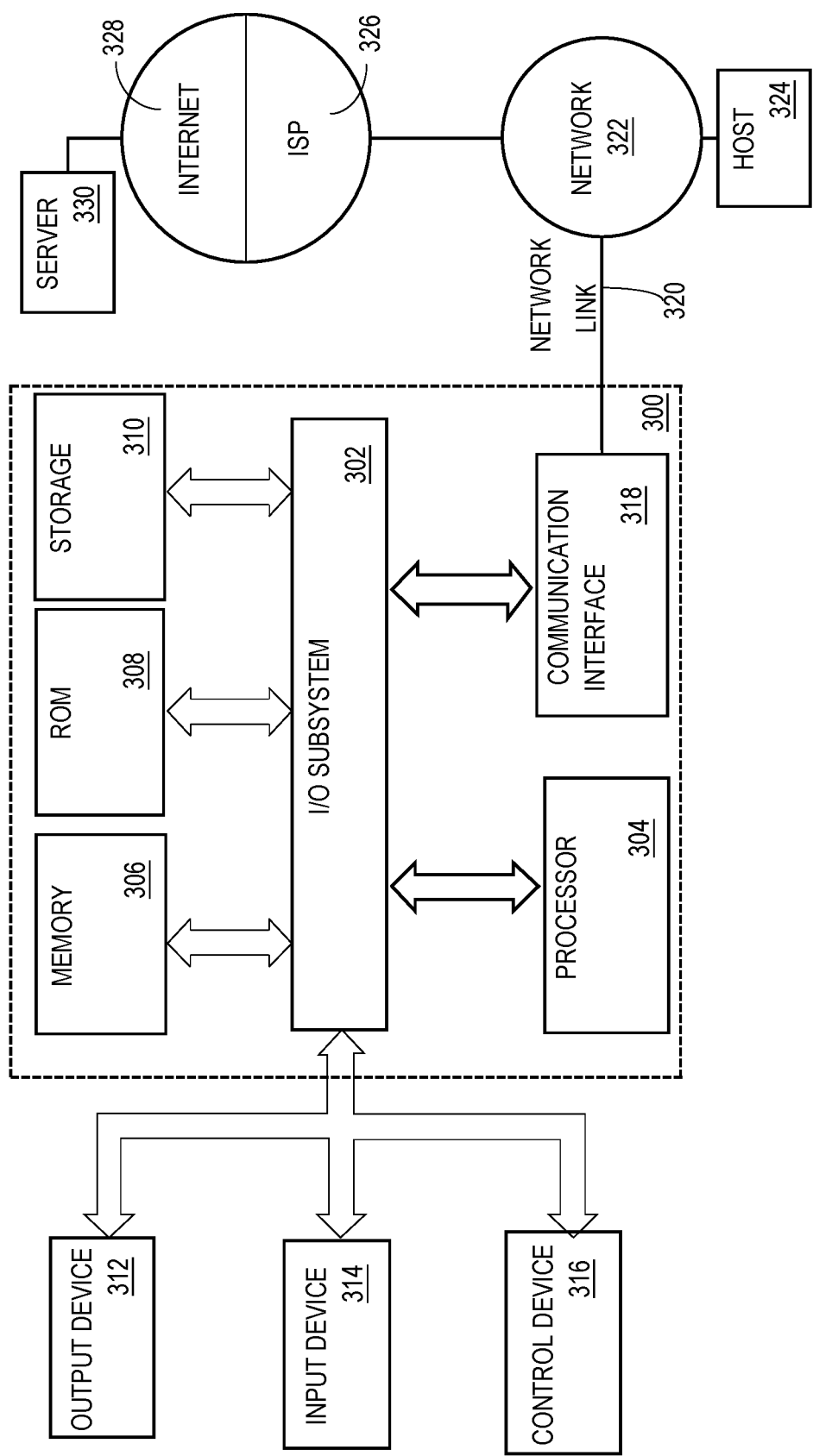
FIG. 3 is a block diagram of a computer system that may be used to implement the automated PK-FK relationship discovery techniques described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for automatically discovering undeclared composite-key-based primary-key-foreign-key relationship, comprising:
    generating a dimensions fingerprint list that includes a plurality of entries, wherein each entry in the dimensions fingerprint list corresponds to a column of a dimension table in a database;
    wherein each entry in the dimensions fingerprint list includes:
        information that identifies a column in the dimension table, and
        a fingerprint that is generated based on contents of the column;
    generating a fact fingerprint list that includes a plurality of entries, wherein each entry in the fact fingerprint list corresponds to a column of a fact table in the database;
    wherein each entry in the fact fingerprint list includes:
        information that identifies a column of the fact table, and
        a fingerprint that is generated based on contents of the column;
    (a) removing, from the dimensions fingerprint list, any entries that satisfy first removal criteria;
    (b) removing, from the fact fingerprint list, any entries that satisfy second removal criteria;
    (c) responsive to no entries from the fact fingerprint list satisfying the second removal criteria, proceeding to step (f), otherwise, proceeding to step (d);
    (d) removing, from the dimensions fingerprint list, any entries that satisfy the first removal criteria;
    (e) responsive to no entries from the dimensions fingerprint list satisfying the first removal criteria, proceeding to step (f), otherwise, returning to step (b);
    (f) selecting a particular pair of fact table columns represented in the fact fingerprint list;
    generating a matched pair collection for the particular pair of fact table columns;
    wherein the match pair collection is a set of matched pairs;
    wherein each matched pair in the set of matched pairs corresponds to the particular pair of fact table columns and a matching pair of dimension table columns that:
        are represented in the dimension fingerprint list, and
        belong to the same dimension table;
    wherein generating the matched pair collection includes determining which pairs of dimension table columns have fingerprints that match the fingerprints of the particular pair of fact table columns;
    creating a filtered matched pair collection by removing, from the matched pair collection, matched pairs that satisfy third removal criteria;
    based at least in part on text similarity, assigning grades to matched pairs in the filtered matched pair collection;
    based on the grades, determining that a particular matched pair represents an undeclared composite-key-based primary-key-foreign-key relationship; and
    storing, in the database, metadata that indicates the undeclared composite-key-based primary-key-foreign-key relationship;
    wherein the method is performed by one or more computing devices.

2. The method of claim 1 further comprising excluding, from the dimensions fingerprint list, all dimension table columns from dimension tables that have a single-column primary key.

3. The method of claim 1 further comprising excluding, from the dimensions fingerprint list, all dimension table columns from dimension tables that have fewer than three columns.

4. The method of claim 1 further comprising excluding, from the dimensions fingerprint list, all dimension table columns that currently store only distinct value or no values.

5. The method of claim 1 wherein the first removal criteria is that the fingerprint in the entry does not represent a superset of any fingerprint in the fact fingerprint list.

6. The method of claim 1 wherein the second removal criteria is that the fingerprint in the entry does not represent a subset of any fingerprint in the dimensions fingerprint list.

7. The method of claim 1 wherein the first removal criteria is that the column represented by the entry does not have a counterpart column represented in the fact fingerprint list.

8. The method of claim 1 wherein the second removal criteria is that the column represented by the entry does not have a counterpart column represented in the dimensions fingerprint list.

9. The method of claim 1 wherein removing, from the matched pair collection, matched pairs that satisfy third removal criteria includes removing, from the matched pair collection, a matched pair where:
the fact table includes a row in which the particular fact pair of table columns store a particular combination of values; and
that matching pair of dimension table columns belong to a dimension table where no row, within the dimension table, stores the particular combination of values in the matching pair of dimension table columns.

10. The method of claim 1 wherein removing, from the matched pair collection, matched pairs that satisfy third removal criteria includes removing, from the matched pair collection, a matched pair where the matching pair of dimension table columns belong to a dimension table where multiple rows, within the dimension table, stores a same combination of values in the matching pair of dimension table columns.

11. The method of claim 1 wherein the entries in the dimensions fingerprint list include entries for columns that belong to a plurality of distinct dimension tables.

12. One or more non-transitory computer-readable media storing instructions for automatically discovering undeclared composite-key-based primary-key-foreign-key relationship, the instructions including instructions which, when executed by one or more computing devices, cause:
generating a dimensions fingerprint list that includes a plurality of entries, wherein each entry in the dimensions fingerprint list corresponds to a column of a dimension table in a database;
wherein each entry in the dimensions fingerprint list includes:
information that identifies a column in the dimension table, and
a fingerprint that is generated based on contents of the column;
generating a fact fingerprint list that includes a plurality of entries, wherein each entry in the fact fingerprint list corresponds to a column of a fact table in the database;
wherein each entry in the fact fingerprint list includes:
information that identifies a column of the fact table, and
a fingerprint that is generated based on contents of the column;
(a) removing, from the dimensions fingerprint list, any entries that satisfy first removal criteria;
(b) removing, from the fact fingerprint list, any entries that satisfy second removal criteria;
(c) responsive to no entries from the fact fingerprint list satisfying the second removal criteria, proceeding to step (f), otherwise, proceeding to step (d);
(d) removing, from the dimensions fingerprint list, any entries that satisfy the first removal criteria;
(e) responsive to no entries from the dimensions fingerprint list satisfying the first removal criteria, proceeding to step (f), otherwise, returning to step (b);
(f) selecting a particular pair of fact table columns represented in the fact fingerprint list;
generating a matched pair collection for the particular pair of fact table columns;
wherein the match pair collection is a set of matched pairs;
wherein each matched pair in the set of matched pairs corresponds to the particular pair of fact table columns and a matching pair of dimension table columns that:
are represented in the dimension fingerprint list, and
belong to the same dimension table;
wherein generating the matched pair collection includes determining which pairs of dimension table columns have fingerprints that match the fingerprints of the particular pair of fact table columns;
creating a filtered matched pair collection by removing, from the matched pair collection, matched pairs that satisfy third removal criteria;
based at least in part on text similarity, assigning grades to matched pairs in the filtered matched pair collection;
based on the grades, determining that a particular matched pair represents an undeclared composite-key-based primary-key-foreign-key relationship; and
storing, in the database, metadata that indicates the undeclared composite-key-based primary-key-foreign-key relationship.

13. The one or more non-transitory computer-readable media of claim 12 further comprising instructions for excluding, from the dimensions fingerprint list, all dimension table columns that currently store only distinct value or no values.

14. The one or more non-transitory computer-readable media of claim 12 wherein the first removal criteria is that the fingerprint in the entry does not represent a superset of any fingerprint in the fact fingerprint list.

15. The one or more non-transitory computer-readable media of claim 12 wherein the second removal criteria is that the fingerprint in the entry does not represent a subset of any fingerprint in the dimensions fingerprint list.

16. The one or more non-transitory computer-readable media of claim 12 wherein the first removal criteria is that the column represented by the entry does not have a counterpart column represented in the fact fingerprint list.

17. The one or more non-transitory computer-readable media of claim 12 wherein the second removal criteria is that the column represented by the entry does not have a counterpart column represented in the dimensions fingerprint list.

18. The one or more non-transitory computer-readable media of claim 12 wherein removing, from the matched pair collection, matched pairs that satisfy third removal criteria includes removing, from the matched pair collection, a matched pair where:
the fact table includes a row in which the particular fact pair of table columns store a particular combination of values; and
that matching pair of dimension table columns belong to a dimension table where no row, within the dimension table, stores the particular combination of values in the matching pair of dimension table columns.

19. The one or more non-transitory computer-readable media of claim 12 wherein removing, from the matched pair collection, matched pairs that satisfy third removal criteria includes removing, from the matched pair collection, a matched pair where the matching pair of dimension table columns belong to a dimension table where multiple rows, within the dimension table, stores a same combination of values in the matching pair of dimension table columns.

20. The one or more non-transitory computer-readable media of claim 12 wherein the entries in the dimensions fingerprint list include entries for columns that belong to a plurality of distinct dimension tables.

\* \* \* \* \*

UNITED STATES PATENT AND TRADEMARK OFFICE
CERTIFICATE OF CORRECTION

PATENT NO. : 12,287,774 B1
APPLICATION NO. : 18/581656
DATED : April 29, 2025
INVENTOR(S) : Shaked et al.

It is certified that error appears in the above-identified patent and that said Letters Patent is hereby corrected as shown below:

In the Specification

In Column 3, Line 58, delete "NAME." and insert -- NAME --, therefor.

In Column 3, Line 59, delete "NAME." and insert -- NAME --, therefor.

In Column 3, Line 61, delete "BIRTH." and insert -- BIRTH --, therefor.

In Column 3, Line 62, delete "STATUS." and insert -- STATUS --, therefor.

In Column 3, Line 64, delete "CODE." and insert -- CODE --, therefor.

In Column 3, Line 66, delete "ID." and insert -- ID --, therefor.

In Column 4, Line 1, delete "ID." and insert -- ID --, therefor.

In Column 4, Line 2, delete "ID." and insert -- ID --, therefor.

In Column 4, Line 3, delete "NUMBER." and insert -- NUMBER --, therefor.

In Column 4, Line 4, delete "LEVEL." and insert -- LEVEL --, therefor.

In Column 4, Line 8, delete "ID." and insert -- ID --, therefor.

In Column 4, Line 11, delete "TO." and insert -- TO --, therefor.

In Column 4, Line 15, delete "ID." and insert -- ID --, therefor.

In Column 4, Line 16, delete "ID." and insert -- ID --, therefor.

Signed and Sealed this
Twenty-second Day of July, 2025

Coke Morgan Stewart
*Acting Director of the United States Patent and Trademark Office*

CERTIFICATE OF CORRECTION (continued)
U.S. Pat. No. 12,287,774 B1

In Column 4, Line 17, delete "ID." and insert -- ID --, therefor.

In Column 4, Line 19, delete "SOLD." and insert -- SOLD --, therefor.

In Column 4, Line 20, delete "SOLD." and insert -- SOLD --, therefor.

In Column 4, Line 21, delete "NAME." and insert -- NAME --, therefor.

In Column 7, Line 2, delete "CUST YEAR_OF_BIRTH" and insert -- CUST_YEAR_OF_BIRTH --, therefor.

In Column 7, Line 8, delete "CUST_STATE PROVINCE" and insert -- CUST_STATE_PROVINCE --, therefor.